(12) United States Patent
Ueno (10) Patent No.: US 7,712,579 B2
(45) Date of Patent: May 11, 2010

(54) FLOOR SILENCER

(75) Inventor: Nobukazu Ueno, Gifu-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/179,646

(22) Filed: Jul. 25, 2008

(65) Prior Publication Data

US 2009/0065298 A1    Mar. 12, 2009

(30) Foreign Application Priority Data

Sep. 6, 2007    (JP) .............................. 2007-232002

(51) Int. Cl.
*E04B 1/82*    (2006.01)
*E04B 1/84*    (2006.01)
*E04B 1/343*    (2006.01)

(52) U.S. Cl. ..................... 181/286; 181/204; 181/287; 181/288; 181/290; 181/292; 181/293; 181/294

(58) Field of Classification Search ................ 181/286, 181/204, 287, 288, 290, 292, 293, 294
See application file for complete search history.

(56) References Cited

U.S. PATENT DOCUMENTS

| 3,251,382 | A | * | 5/1966 | Tatsch | 138/151 |
| 3,698,879 | A | * | 10/1972 | Lucien | 428/594 |
| 3,774,249 | A | * | 11/1973 | Ybarra et al. | 5/419 |
| 4,416,349 | A | * | 11/1983 | Jacobs | 181/208 |
| 4,479,994 | A | * | 10/1984 | Berg | 428/195.1 |
| 4,637,184 | A | * | 1/1987 | Radtke et al. | 52/220.4 |
| 4,758,457 | A | * | 7/1988 | Altus | 428/82 |
| 5,053,262 | A | * | 10/1991 | Kerr | 428/81 |
| 5,473,125 | A | * | 12/1995 | Stief et al. | 181/290 |
| 5,620,546 | A | * | 4/1997 | Reuben | 156/219 |
| 5,744,763 | A | * | 4/1998 | Iwasa et al. | 181/286 |
| 5,886,305 | A | * | 3/1999 | Campbell et al. | 181/286 |
| RE36,323 | E | * | 10/1999 | Thompson et al. | 181/286 |
| 6,114,014 | A | * | 9/2000 | Ikeda et al. | 428/192 |
| 6,382,350 | B1 | * | 5/2002 | Jezewski et al. | 181/290 |
| 6,576,172 | B1 | * | 6/2003 | Ario et al. | 264/40.3 |

(Continued)

FOREIGN PATENT DOCUMENTS

JP    2001-060091 A    3/2001

OTHER PUBLICATIONS

English language Abstract and translation of JP 2001-060091 A.

*Primary Examiner*—Jeffrey Donels
*Assistant Examiner*—Christina Russell
(74) *Attorney, Agent, or Firm*—Greenblum & Bernstein, P.L.C.

(57) ABSTRACT

It is an object of the present invention to provide a floor silencer that has good transport efficiency due to an ability to be transported in a flat state, and can be assembled to a floor panel of a vehicle by folding along a band-like concave portion. The floor silencer is used with a first surface side in contact with a floor carpet, and a second surface side in contact with the floor panel of the vehicle. The floor silencer also has the band-like concave portion and can be folded along the band-like concave portion. The floor silencer is transported in a flat state and not folded during transport, and is used folded along the band-like concave portion during assembly.

20 Claims, 7 Drawing Sheets

U.S. PATENT DOCUMENTS

| | | | |
|---|---|---|---|
| 6,595,321 | B1* | 7/2003 | Tompson .................... 181/290 |
| 7,464,790 | B2* | 12/2008 | Kodama et al. ............. 181/295 |
| 2004/0048036 | A1* | 3/2004 | Nakasuji et al. ............... 428/95 |
| 2004/0129493 | A1* | 7/2004 | Campbell .................... 181/204 |
| 2004/0248490 | A1* | 12/2004 | Hyuga et al. ................ 442/327 |
| 2005/0126852 | A1* | 6/2005 | Nakajima et al. ........... 181/293 |
| 2005/0233106 | A1* | 10/2005 | Imamura et al. .............. 428/95 |
| 2006/0118355 | A1* | 6/2006 | Blomeling et al. .......... 181/286 |
| 2006/0201741 | A1* | 9/2006 | Inoue et al. .................. 181/204 |
| 2006/0260272 | A1* | 11/2006 | Swiszcz et al. ............. 52/783.1 |
| 2008/0128201 | A1* | 6/2008 | Yamaguchi et al. ......... 181/286 |

\* cited by examiner

FLOOR SILENCER

BACKGROUND OF THE INVENTION

1. Field of the Invention

The present invention relates to a floor silencer. More specifically, the present invention relates to a floor silencer that is used interposed between a floor carpet and a body panel of a vehicle, and has a foldable and band-like concave portion, wherein the floor silencer is capable of transport in a flat state and capable of assembly to a floor panel of the vehicle through folding along the band-like concave portion.

2. Description of the Related Art

Figure 13:
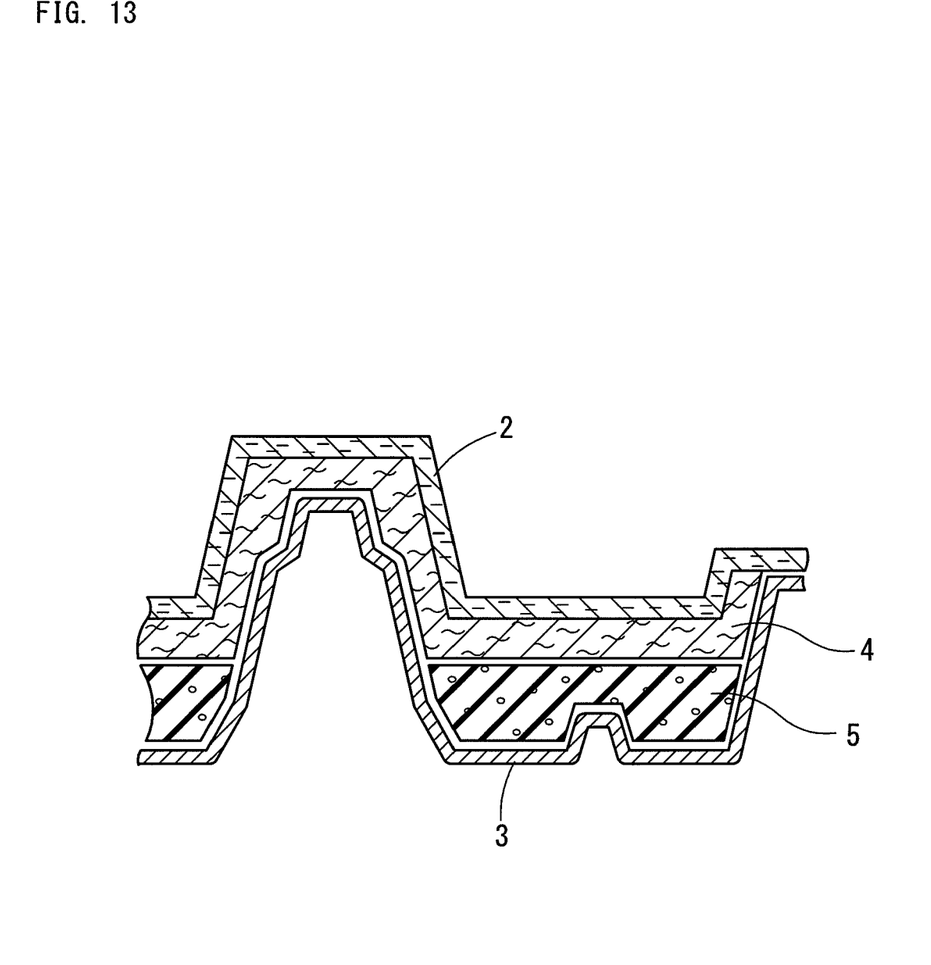
FIG. 13 is a schematic diagram for explaining a cross section of a conventional member in which the floor carpet and the sound insulation material are integrally joined, the bulk material, and the floor panel of the vehicle.

Referring to FIG. 13, related art uses a member in which a floor carpet 2 and a sound insulation material 4 made from non-woven fabric or the like are integrally joined as a vehicular floor material. Further, a floor panel 3 of the vehicle comes to have many members disposed thereon and a complicated shape. Therefore, in order to achieve a flat carpet surface and a sufficient cushioning property, a bulk material 5 is used in combination interposed between the sound insulation material 4 and the floor panel 3. The bulk material 5 employs a member (see Patent Document 1 for an example) that is made from integrally bonding chips of a resin foam body such as polyurethane foam using a binder made from resin fiber. In addition to its bulk function, the bulk material 5 also has sound insulating, cushioning, and other properties.

Patent Document 1: Japanese Patent Application Publication No. JP-A-2001-60091

As noted above, the bulk material 5 and the member formed by joining the floor carpet 2 and the sound insulation material 4 are all made as separate bodies, after which these are transported from their respective production sites and integrally assembled to the floor panel 3 at the time of vehicle manufacture. Accordingly, the floor surface of the vehicle is made flat and the floor material also has sound insulating, cushioning, and other properties. However, the member formed by joining the floor carpet 2 and the sound insulation material 4 has a complicated shape that follows the floor panel and a considerable thickness, which result in low transport efficiency. Furthermore, if the joined sound insulation material 4 is made by laminating a plurality of non-woven fabrics, this leads to an increased number of components. Such a sound insulation material 4 consequently lowers the production efficiency of the floor carpet.

Hence, development of a floor silencer was undertaken that separates the sound insulation material from the floor carpet and instead integrally forms the sound insulation material with the bulk material. Thus, a process for joining the sound insulation material to the floor carpet is no longer required and results in improved transport efficiency of the floor carpet. Furthermore, since the sound insulation material and the bulk material overlap in terms of required functions, such as sound insulating, cushioning, and other properties, both can function the same as in the past even while using the same material and being integrally formed as a floor silencer. In related art, a plurality of bulk material is respectively disposed at required locations. However, this lowers the transport efficiency of the bulk material and also leads to poor workability during assembly. Using an integrally molded part of the same material can achieve a significant reduction in the overall number of floor material components, as well as greatly improve transport efficiency and assembly workability.

However, a conventional floor silencer made from integrating sound insulation material and bulk material has a complicated and three-dimensional shape that follows the floor panel as a necessity, even though this lowers transport efficiency.

SUMMARY OF THE INVENTION

[Problems to be Solved by the Invention]

The present invention was devised to resolve the foregoing problems, and it is an object of the present invention to provide a floor silencer that can be transported in a flat state during transport, and can be assembled by folding along a band-like concave portion during assembly, so as to achieve good transport efficiency in combination with good workability when handled, such as during assembly.

It is a further object of the present invention to improve transport of a floor carpet as a unit with a sound insulation material as separate when such a floor silencer is used.

[Means for Solving Problem]

A floor silencer is provided and may be used with a first surface side in contact with a floor carpet and a second surface side in contact with a floor panel of a vehicle, wherein a band-like concave portion is provided in a thickness direction, and said floor silencer is foldable along said band-like concave portion.

In embodiments, a plurality of openings may be provided in said band-like concave portion at a predetermined interval.

In other embodiments, a compressed portion in the thickness direction at said band-like concave portion may be distributed more toward a side that will extend after folding.

In various embodiments, a ratio (W/d) of a width (W) of said band-like concave portion and a depth (d) of said band-like concave portion may be 0.5 to 2.0, and a ratio (t/T) of a thickness (t) of said floor silencer at said band-like concave portion and a thickness (T) of said floor silencer at a position adjacent to said band-like concave portion may be 0.1 to 0.5.

The floor silencer may be transported in a flat state without folding during transport, and may be used folded along said band-like concave portion during assembly.

In still other embodiments, said compressed portion may be formed such that said compressed portion, when folded, may be pressed from only the first surface side subject to compression.

In further embodiments, a ratio (Lo/La) of a total dimension (Lo) in a length direction of said band-like concave portion of said plurality of openings and a length (La) of said band-like concave portion may be 0.4 to 0.8.

[Effect of the Invention]

The floor silencer according to the present invention is a molded part in which a sound insulation material, which is conventionally joined with the floor carpet, and a separate bulk material are instead integrally formed. The floor silencer is used with a first surface side in contact with the floor carpet and a second surface side in contact with the floor panel of the vehicle. The floor silencer can be transported in a flat state, has good transport efficiency, and is foldable along the band-like concave portion. Therefore, the floor silencer can be assembled by folding along a raised portion of the floor panel of the vehicle, which enables good workability during assembly. In addition, the sound insulation material is separate and thus enables an improvement in the transport efficiency of the floor carpet as a single unit.

Furthermore, if the plurality of openings is provided in the band-like concave portion at a predetermined interval, then folding can be more easily achieved for improved workability during assembly.

The compressed portion in the thickness direction at the band-like concave portion may be distributed more toward a side that will extend after folding. In such case, folding toward a side opposite the side that will extend after folding is easily achieved, and upper edge portions on both sides of the band-like concave portion approach one another at inner sides of the folded locations. As a consequence, a reduction in a sound insulating property is suppressed.

Moreover, the compressed portion may be formed such that the compressed portion, when folded, is pressed from only the first surface side subject to compression. In such case, folding toward a side opposite the side that will extend after folding is further easily achieved, and upper edge portions on both sides of the band-like concave portion contact at inner sides of the folded locations. As a consequence, a reduction in a sound insulating property is further suppressed.

The ratio (W/d) of the width (W) of the band-like concave portion and the depth (d) of the band-like concave portion may be 0.5 to 2.0, and the ratio (t/T) of the thickness (t) of the floor silencer at the band-like concave portion and the thickness (T) of the floor silencer at a position adjacent to the band-like concave portion may be 0.1 to 0.5. Moreover, the ratio (Lo/La) of the total dimension (Lo) in the length direction of the band-like concave portion of the plurality of openings and the length (La) of the band-like concave portion may be 0.4 to 0.8. In such cases, there are no problems such as breakage along the band-like concave portion during transport, assembly, or the like, or excessive rigidity that makes folding difficult. As a consequence, good workability can be achieved during handling for assembly or the like.

In addition, if the floor silencer is transported in a flat state without folding during transport and is used folded along the band-like concave portion during assembly, then high transport efficiency can be achieved. Also, the floor silencer can be easily assembled by folding along the floor panel of the vehicle, and therefore has good workability.

DESCRIPTION OF REFERENCE NUMERALS AND SIGNS

1; floor silencer, 11; band-like concave portion, 11a; upper edge portion, 12; opening, 1a; foot stay portion, 1b; tunnel portion, 1b1; tunnel upper portion, 1c; rocker portion, 2; floor carpet, 3; floor panel, 4; sound insulation material and 5; bulk material.

DETAILED DESCRIPTION OF THE PREFERRED EMBODIMENTS

Hereinafter, the present invention will be described in detail with reference to the drawings.

A floor silencer 1 according to the present invention is used with a first surface side in contact with a floor carpet 2, and a second surface side in contact with a floor panel 3 of a vehicle. The floor silencer 1 also has a band-like concave portion 11 in a thickness direction, and the floor silencer 1 is foldable along the band-like concave portion 11 (see FIGS. 1 and 3).

The floor silencer 1 of the present invention is a member in which a sound insulation material 4, which is conventionally joined with the floor carpet 2, and a separately disposed bulk material 5 are instead integrally formed (see FIG. 13 regarding the sound insulation material 4 and the bulk material 5). In addition to having sound insulating, cushioning, and other properties, the floor silencer 1 also functions as a bulk material. During assembly to the vehicle, the floor silencer 1 is mounted such that the second surface side having a three-dimensional shape similar to the floor panel 3 of the vehicle faces the floor panel 3, and the first surface side is used to accommodate layering of the floor carpet 2 thereon (see FIGS. 2 and 4).

The floor silencer 1 is not particularly limited in terms of material, and examples such as a laminated material made by laminating a plurality of non-woven fabric layers or the like, and a compact made from a resin foam body, are conceivable. More specifically, materials may be used which are identical to that for a conventional sound insulation material 4 integrally joined with the floor carpet 2 and for a conventional bulk material 5 disposed separately, and formation according to a method identical to a conventional method may be performed. The conventional sound insulation material 4 is often a laminated material formed by laminating a plurality of non-woven fabric layers, and the bulk material 5 is usually a compact formed with a binder through thermal adhesion of chips made from a resin foam body. Accordingly, the floor silencer 1 may also use the same conventional laminated material and compact material. Formation of the floor silencer 1 may also be performed according to a method identical to conventional practice.

In addition, the conventional sound insulation material 4 made from a laminated material has many components and low production efficiency. Therefore, the floor silencer 1, similar to the conventional bulk material 5, is preferably a compact formed with a binder through thermal adhesion of chips made from a resin foam body. Furthermore, it is also possible to recycle a waste material as the chips made from the resin foam body, provided that the floor silencer 1 is capable of meeting a predetermined level of quality.

In the case of recycled waste material, the waste material is not particularly limited. For example, any retained material from shredder dust of a vehicle, excluding dust such as metal, glass, and wire harnesses, can be used. The use of high-grade dust such as the resin foam body, such as polyurethane foam, and various fibers or the like sorted from the shredder dust of a vehicle is especially preferable. Such high-grade dust may contain 50 mass % or more of chips from a resin foam body such as polyurethane foam (where the total amount of dust is 100 mass %), and most of a remaining portion thereof (90 mass % or more of the remaining portion) may come from fiber pieces such as textiles used as the fabric cover of a vehicle seat or the like.

In addition, defective parts generated when manufacturing the floor silencer 1, and scrap materials generated from trimming or the like can be crushed and/or fiberized for reuse as the waste material. Waste materials generated from other industrial fields besides the automotive industry can be reused as the raw material of the floor silencer 1 as well. Alternatively, such waste materials can be used in combination with the waste material generated in the automotive industry. Chips from unused resin, rubber, and the like may also be mixed and used as necessary to adjust the quality of the floor silencer 1 or for other purposes.

The chips are not particularly limited in terms of shape and dimension. In order to efficiently manufacture a high-quality floor silencer 1, chips without a long narrow shape, i.e., a large aspect ratio, are preferable. Even more preferable are chips that do not have a long narrow shape, and whose average size is 20 mm or less, especially 10 mm or less.

The binder used for thermal adhesion of the chips is also not particularly limited. Conceivable binders include one made from a thermoplastic resin fiber. In addition, the binder preferably uses a core-in-sheath fiber formed from a sheath portion with a low melting point that melts and a core portion with a high melting point that does not melt due to heating during manufacture of the floor silencer 1. Usable core-in-sheath fibers include a core-in-sheath fiber whose sheath portion is made from polyester with a relatively low melting point and whose core portion is made from polyester with a relatively high melting point, and a core-in-sheath fiber whose sheath portion is made from polyethylene and whose core portion is made from polyester. The fiber length is not particularly limited, however, the fiber length preferably does not differ greatly from the size of the chips subjected to thermal adhesion using the binder. Thus, the chips and the binder are easily mixed and result in better sound insulating, cushioning, and other properties in the floor silencer 1.

The chips and the binder are also not particularly limited in terms of mass ratio, provided that the chips can be firmly fixed by the binder. If the total amount of the chips and the binder is 100 mass %, then the amount of binder can be set at 5 to 25 mass %, and preferably 10 to 20 mass %. In cases where the chips and the binder can be sufficiently distributed in a uniform manner, the amount of binder may be set even smaller at 5 to 15 mass %.

Figure 1:
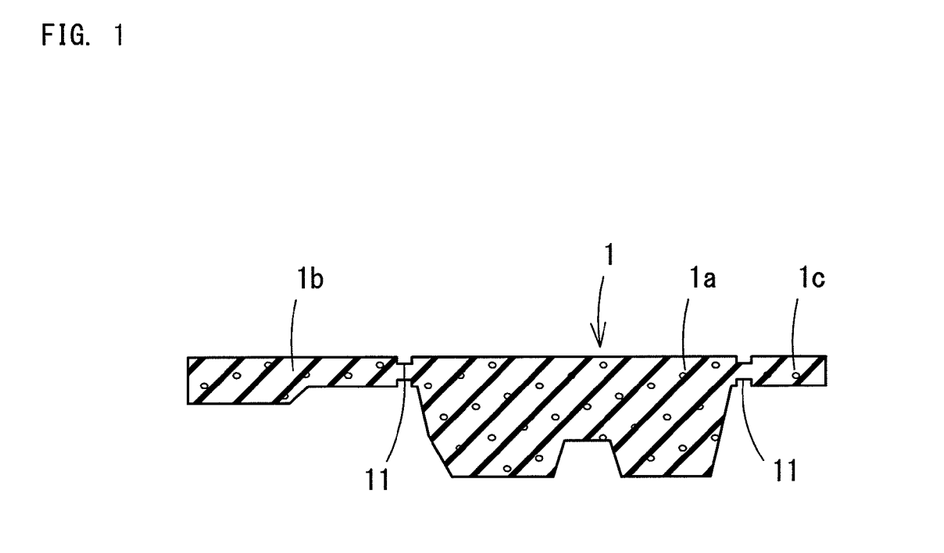
FIG. 1 is a cross-sectional schematic diagram of a floor silencer at a location on only one side of a tunnel where the floor silencer is not disposed on an upper surface of the tunnel of a floor panel in a vehicle.
Figure 2:
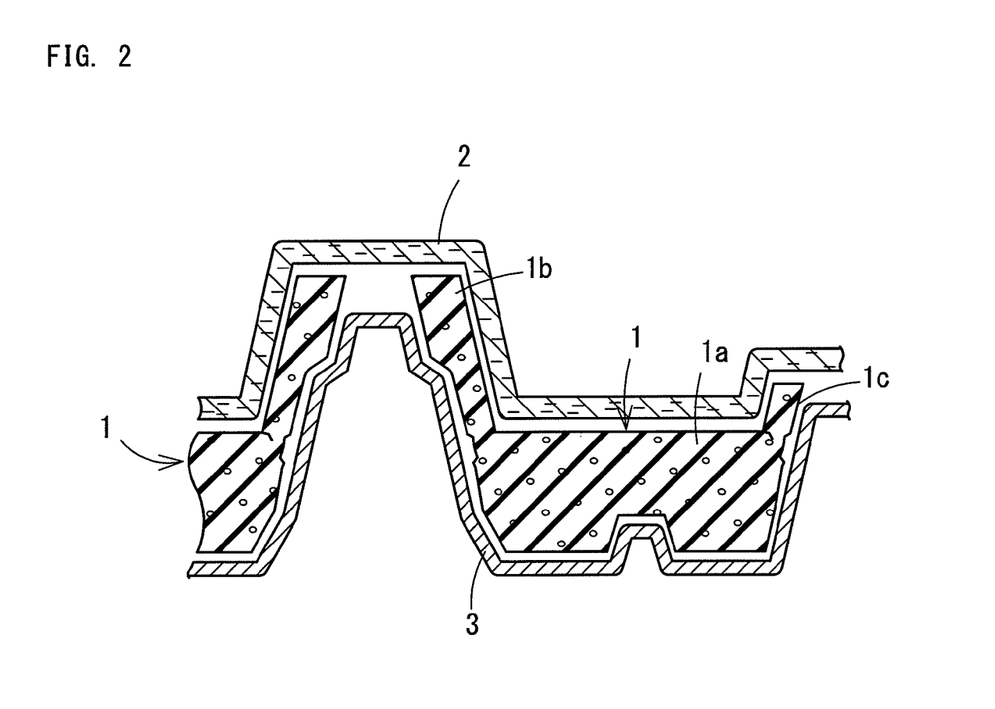
FIG. 2 is a schematic diagram for explaining a cross section of the floor panel, the floor silencer, and a floor carpet at the location in FIG. 1.
Figure 3:
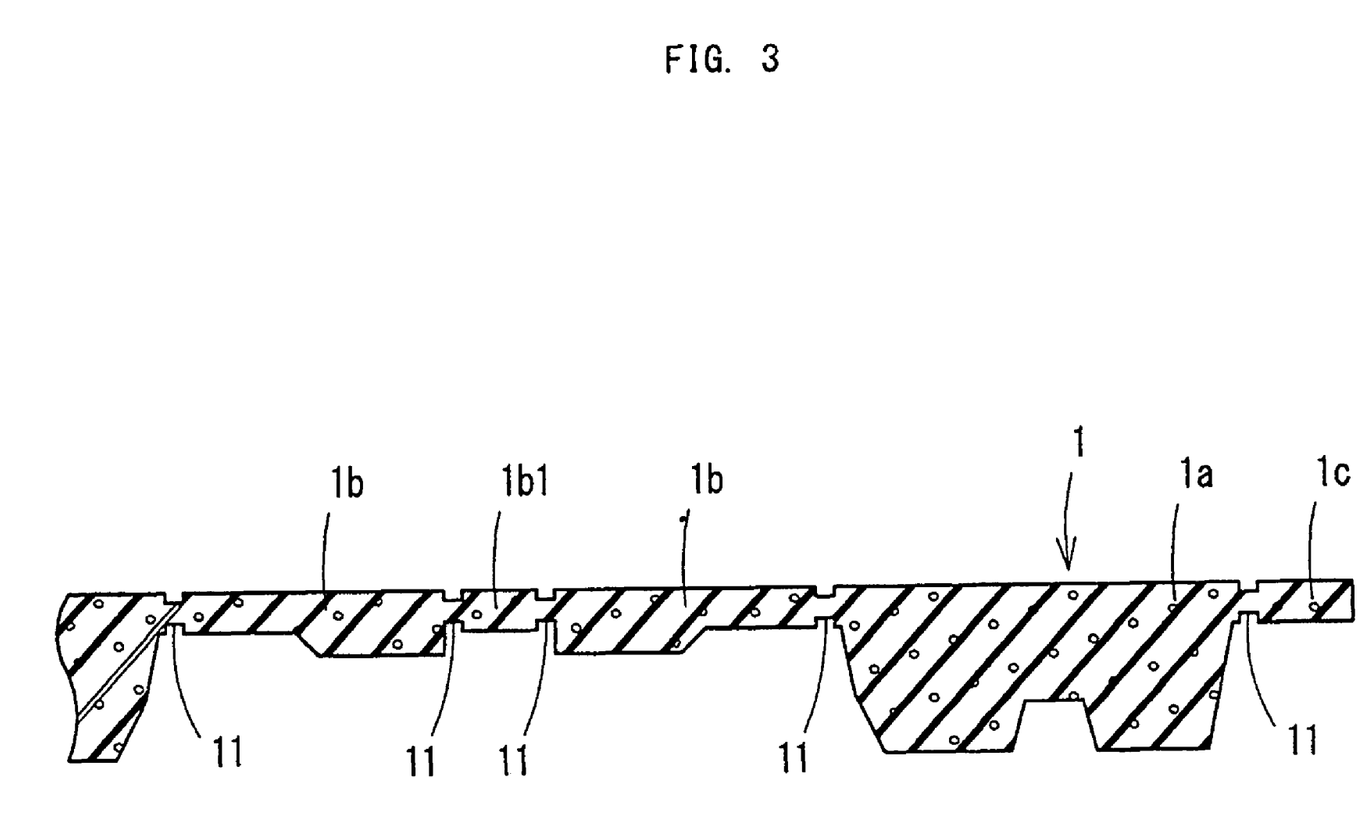
FIG. 3 is a cross-section schematic diagram of the floor silencer at a location where the floor silencer is disposed on the upper surface of the tunnel of the floor panel in the vehicle.
Figure 4:
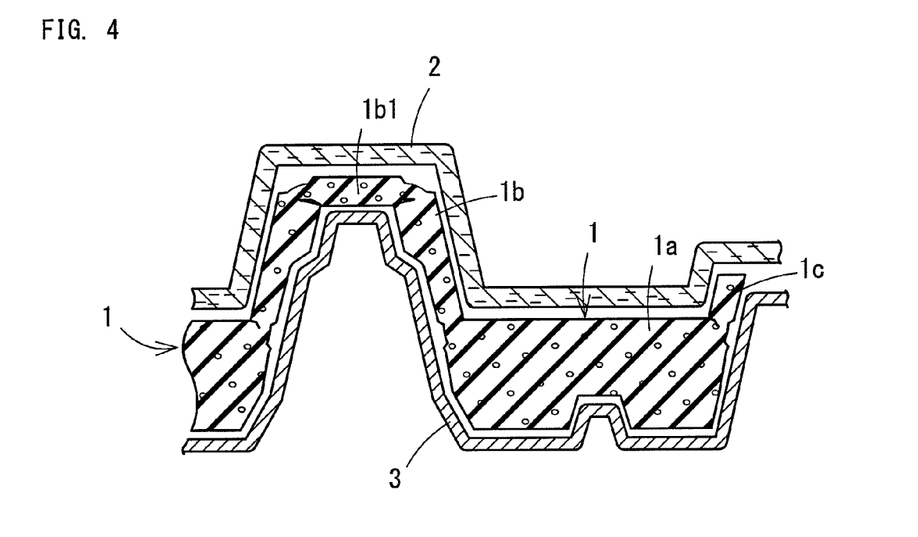
FIG. 4 is a schematic diagram for explaining a cross section of the floor panel, the floor silencer, and the floor carpet at the location in FIG. 3.

The floor silencer 1 according to the present invention has a band-like concave portion 11 in the thickness direction (see FIGS. 1 and 3), and is foldable along the band-like concave portion 11 (see FIGS. 2 and 4). The floor panel 3 of the vehicle is provided with raised portions to provide a tunnel for passing a propeller shaft, an exhaust pipe, or the like through, or the like, a rocker panel, and the like. At raised portions of the floor panel 3, the floor silencer 1 also rises in accordance with the shape of the floor panel 3. Accordingly, there is no problem with giving the floor silencer a three-dimensional shape that follows the floor panel in terms of practicality, however, there is a problem of low transport efficiency for a floor silencer with a three-dimensional shape. Hence, the floor silencer 1 is formed with the band-like concave portion 11 at required locations for achieving a three-dimensional shape through raising or the like, and is capable of folding along the band-like concave portion 11 during assembly. As a consequence, the floor silencer 1 can be transported in a flat state during transport, and has good transport efficiency. In addition, the floor silencer 1 can easily achieve a three-dimensional shape that follows the floor panel 3 during assembly.

If at least a portion of the raw material has thermoplasticity, then the band-like concave portion 11 can be easily formed by simply heating required locations and applying pressure as necessary, similar to the floor silencer 1 described above as formed using chips and a binder. The width and the depth of the band-like concave portion 11 is preferably adjusted in consideration of the following: (1) no tendency to easily break due to contact with other components during times such as transport and assembly of the floor silencer 1, (2) no handling difficulties during assembly and the like due to inadequate strength in the band-like concave portion 11, (3) an ability to be provided in a manner that sufficiently follows the shape of the floor panel 3 of the vehicle, and (4) the material of the floor silencer 1.

Figure 5:
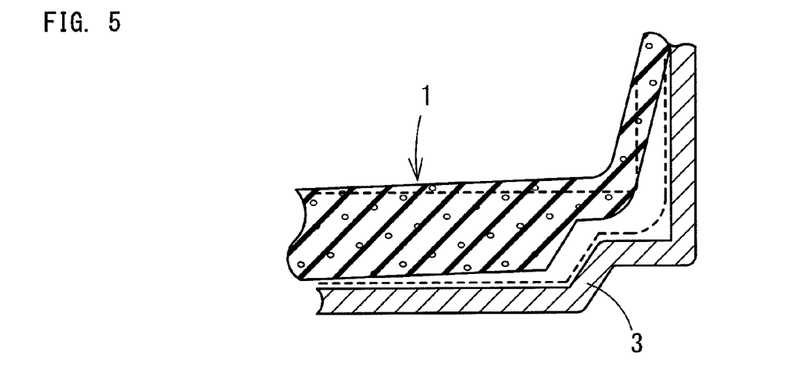
FIG. 5 is a schematic diagram for explaining a condition where a band-like concave portion is not provided and assembly along the floor panel of the vehicle is impossible due to excessive stiffness.
Figure 6:
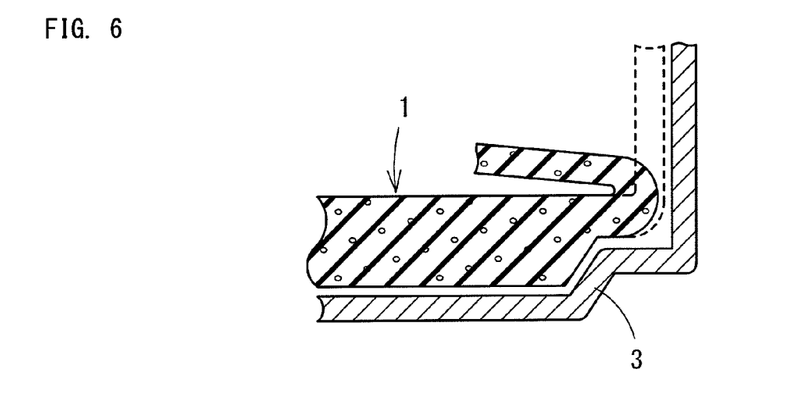
FIG. 6 is a schematic diagram for explaining a case of poor workability due to excessive softness that results in falling over sideward during assembly along the floor panel of the vehicle.

Workability and the like during assembly will be explained in more detail here. If the floor silencer 1 is excessively rigid or the band-like concave portion 11 has an inadequate width and depth, then the floor silencer 1 does not easily deform to follow the shape of the floor panel 3 of the vehicle. Consequently, a space is left between the floor silencer 1 and the floor panel 3. (See FIG. 5, where a broken line is a virtual line that indicates assembly of the floor silencer along the floor panel.) Meanwhile, if the floor silencer 1 is excessively soft or the band-like concave portion 11 is too wide and deep, then a raised portion easily falls over during assembly and results in reduced workability. (See FIG. 6, where a broken line is a virtual line that indicates assembly of the floor silencer along the floor panel.)

The width and the depth of the band-like concave portion 11 (wherein the depth is a total depth when the band-like concave portion 11 is provided at a position facing both surface sides of the floor silencer 1) will be explained in more detail here. The band-like concave portion 11 preferably has a width (W) and a depth (d) whose ratio (W/d) is 0.5 to 2.0. To describe a thickness of the floor silencer 1 in more detail, the floor silencer 1 preferably has a thickness (t) at the band-like concave portion 11 and a thickness (T) at a position adjacent to the band-like concave portion 11 whose ratio (t/T) is 0.1 to 0.5. (See FIG. 11 regarding the above W, d, t, and T).

Figure 9:
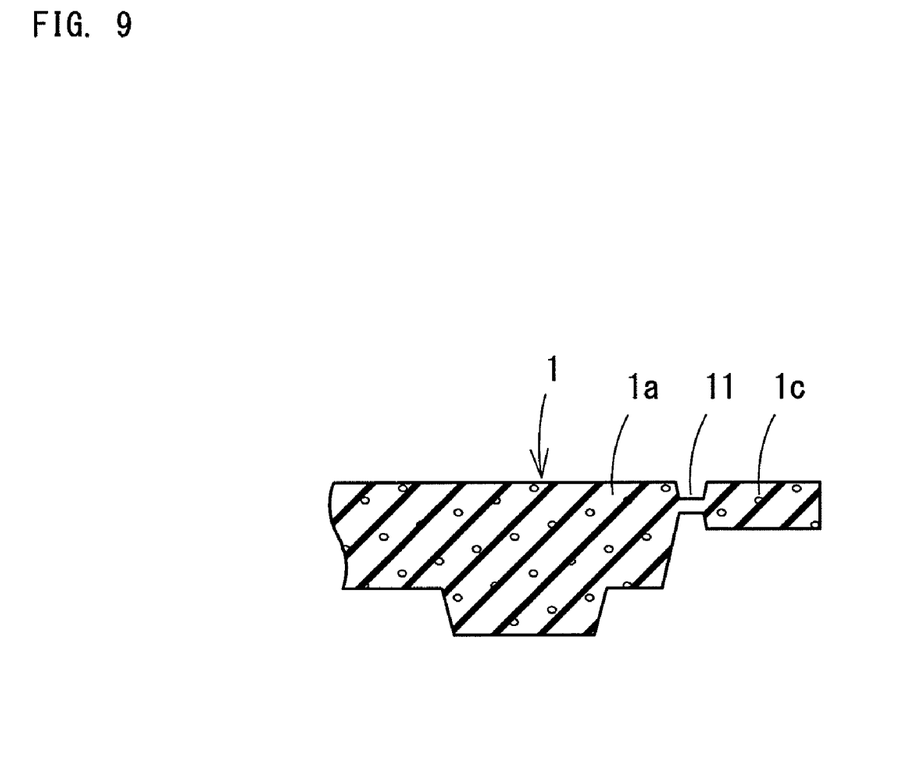
FIG. 9 is a cross-sectional schematic diagram of a mode in which the band-like concave portion is provided on upper and lower surface sides of the floor silencer.
Figure 10:
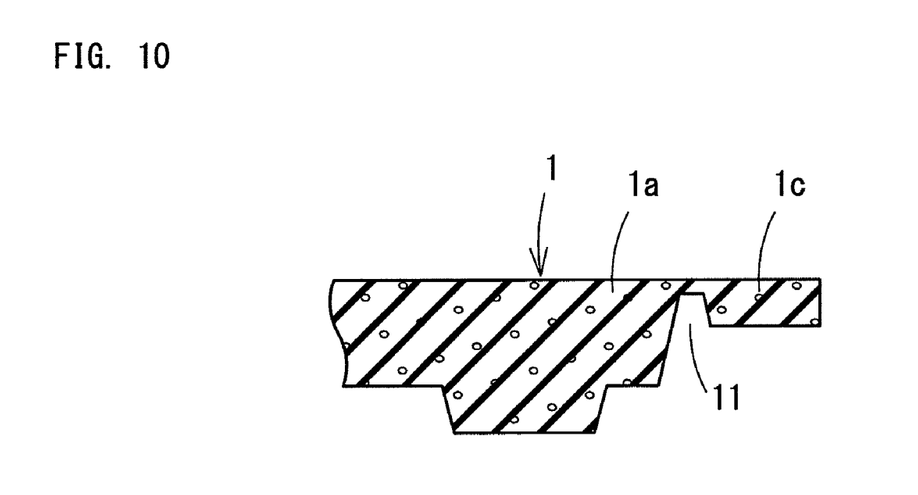
FIG. 10 is a cross-sectional schematic diagram of a mode in which the band-like concave portion is provided only on the lower surface side of the floor silencer.
Figure 11:
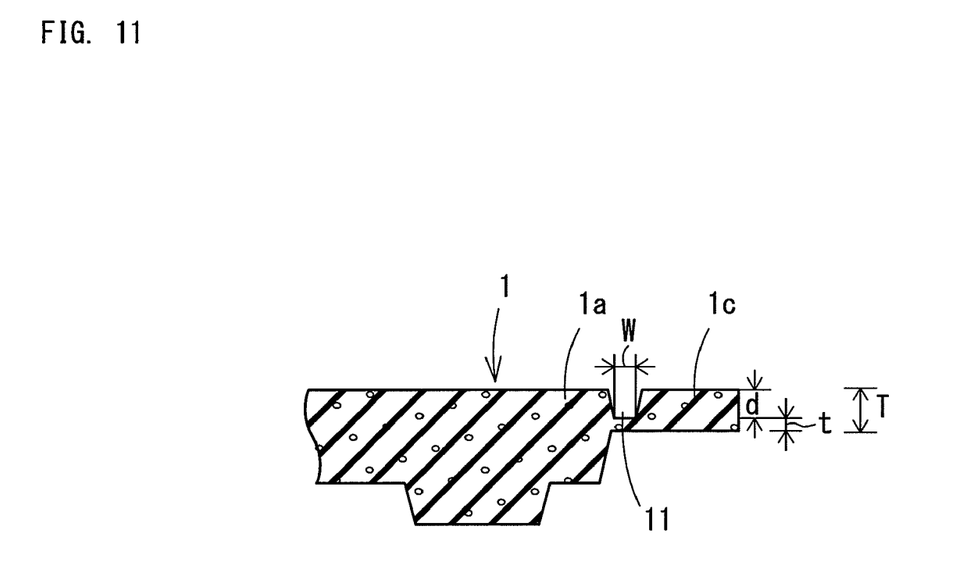
FIG. 11 is a cross-sectional schematic diagram of a mode in which the band-like concave portion is provided only on the upper surface side of the floor silencer.

The band-like concave portion 11 may be provided at a position facing both surface sides in the thickness direction of the floor silencer 1 (see FIG. 9), or provided on a side in contact with the floor panel 3 (see FIG. 10), or provided on a side in contact with the floor carpet 2 (see FIG. 11). By providing the band-like concave portion 11 in such a manner, a first side and a second side demarcated by the band-like concave portion 11 of the floor silencer 1 have forms that are connected through a compressed portion formed by providing the band-like concave portion 11. In this case, a folded and raised side (e.g. a tunnel portion 1b and a rocker portion 1c in FIGS. 1 and 3) with a large surface area is especially prone to causing problems such as breakage and falling over during assembly. Therefore, it is preferable that the width and the depth of the band-like concave portion 11 are sufficiently adjusted in consideration of strength, workability, and the like. As noted above, the band-like concave portion 11 may be provided on either side in the thickness direction of the floor silencer 1, but is preferably provided such that the compressed portion in the thickness direction at the band-like concave portion 11 is distributed more toward the side that will extend after folding. In addition, the compressed portion is more preferably formed such that the compressed portion, when folded, is pressed from only the first surface side subject to compression. In other words, it is more preferable that the band-like concave portion 11 is not formed on the side that becomes extended after folding, and is instead formed only on the side subject to compression after folding (see FIG. 11).

Figure 12:
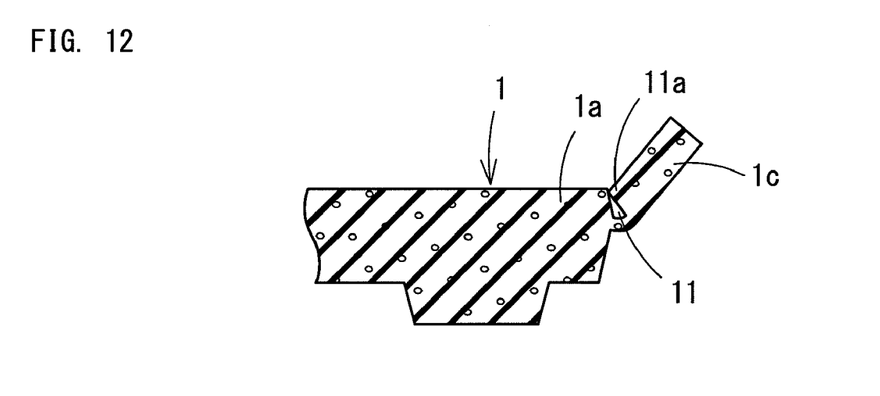
FIG. 12 is a cross-sectional schematic diagram of a condition where the band-like concave portion is provided only on the upper surface side of the floor silencer and an upper edge portion on both sides of the band-like concave portion are folded upward so as to come into contact.

As described above, in cases where the compressed portion is distributed more toward the side extended after folding, and especially in cases where the compressed portion is formed pressed from only the first surface side compressed after folding (see FIG. 11), upper edge portions on both sides of the band-like concave portion 11 easily contact after folding (see an upper edge portion 11a in FIG. 12). By providing the band-like concave portion 11, it is thus possible to suppress a reduction in the sound insulating and other properties of the floor silencer 1.

Figure 7:
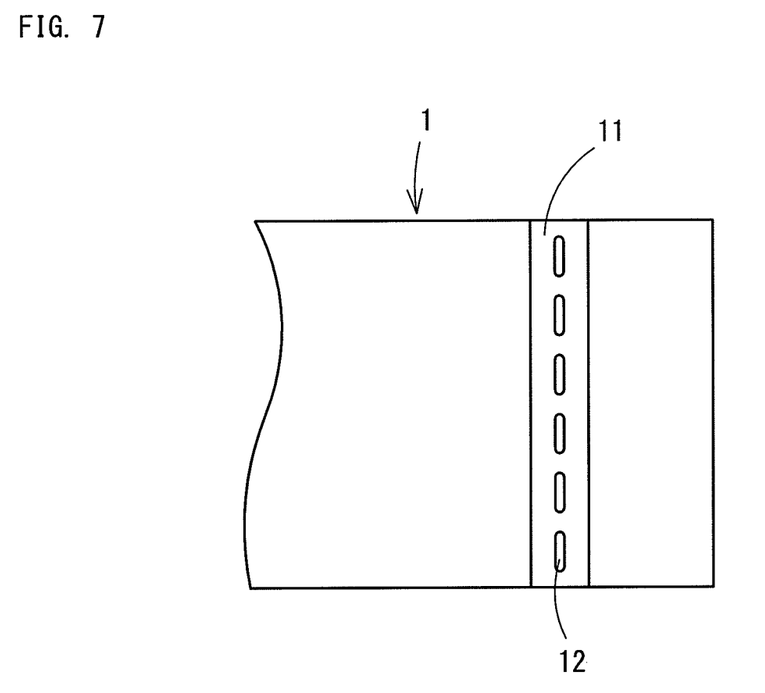
FIG. 7 is a schematic diagram illustrating the band-like concave portion provided in the floor silencer and an opening provided in the band-like concave portion.
Figure 8:
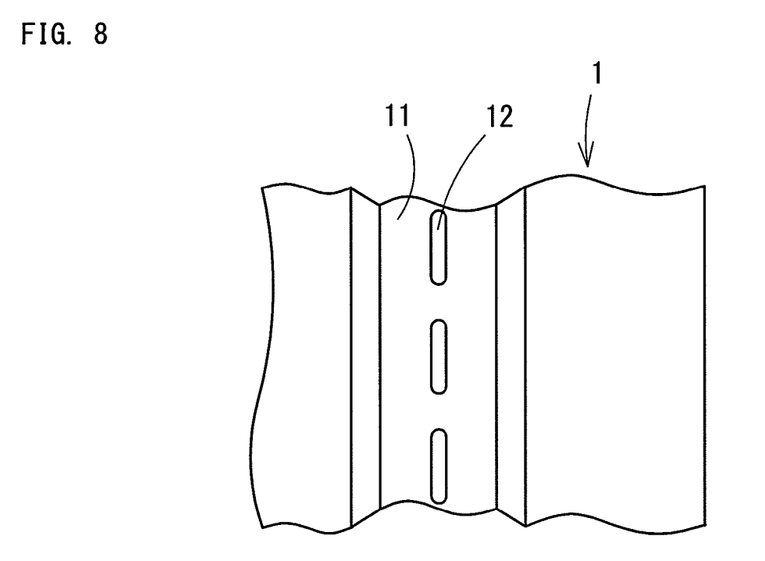
FIG. 8 is a partially expanded view of FIG. 7 and a schematic diagram depicting a concave portion in an easy to understand manner.

The strength and workability during handling such as assembly of the band-like concave portion 11 can also be adjusted by provided a plurality of openings 12 at predetermined intervals in the band-like concave portion 11 (see FIGS. 7 and 8). A position at which the opening 12 is provided is not particularly limited provided that the floor silencer 1 is capable of achieving sufficient strength, good workability, and so on. The opening 12 may be provided at a central portion in a width direction of the band-like concave portion 11 (see FIGS. 7 and 8), or provided at a position closer to either side. The position of the opening 12 preferably takes into account workability during assembly, and is according to a raised angle or the like. Moreover, all of the openings 12 may be provided at identical positions in the width direction of the band-like concave portion 11, or a portion of the openings 12 provided at different positions. Normally all of the openings 12 are provided at identical positions in the width direction of the band-like concave portion 11 (see FIG. 7).

Furthermore, the opening 12 is not particularly limited in terms of intervals in a length direction of the band-like concave portion 11, although the opening 12 is normally provided at regular intervals (see FIG. 7). Depending on where the band-like concave portion 11 is positioned on the floor silencer 1, the intervals of the opening 12 can also be adjusted.

In addition, the opening 12 is not particularly limited in terms of shape and dimension provided that the floor silencer 1 is capable of achieving sufficient strength, good workability, and so on. The opening 12 may be shaped as a rectangle, a square, an oval, an ellipse, or a circle, and is preferably shaped as a rectangle, an oval (see FIGS. 7 and 8), an ellipse, or the like. Moreover, the dimensions of the opening 12 are preferably 2 to 10 mm, or more preferably 3 to 7 mm, in the width direction of the band-like concave portion 11, and 10 to 70 mm, or more preferably 20 to 60 mm, in the length direction. An interval of the opening 12 in the length direction of the band-like concave portion 11 (a minimum dimension between end portions of adjacent openings) is preferably 10 to 40 mm, or more preferably 20 to 40 mm. Depending on where the band-like concave portion 11 is positioned on the floor silencer 1, the shape and dimensions of the opening 12, particularly the dimensions, can also be adjusted.

A ratio (Lo/La) of a total dimension (Lo) in the length direction of the band-like concave portion 11 of the plurality of openings 12 and a length (La) of the band-like concave portion 11 is not particularly limited provided that the floor silencer 1 has sufficient strength, good workability, and the like. However, a ratio of 0.4 to 0.8 is preferred. This ratio is preferably adjusted depending on the dimensions of the opening 12, the material of the floor silencer 1, and so on. However, in cases where the floor silencer 1 is formed using the chips and the binder, the floor silencer 1 can achieve sufficient strength, good workability, and the like with the above-mentioned ratio.

Note that while the width and the depth of the band-like concave portion 11 can be set as described above, a portion forming a foot stay portion 1a of the floor silencer 1 (see FIGS. 1 to 4) may be provided with a member whose dimensions exceed the aforementioned width and depth, particularly the width. In such case, the width and the depth of the band-like concave portion 11 may also exceed the specified numerical range above. However, such a band-like concave portion 11, especially a wide band-like concave portion 11, corresponds to the band-like concave portion 11 of the floor silencer 1 according to the present invention.

The floor silencer 1 of the present invention is not particularly limited in terms of manufacturing method, and past known methods may be employed without modification depending on the type of raw material and so forth. For example, in the case of the floor silencer 1 formed using the chips and the binder, the chips and the binder are charged to a forming die and heated and pressed for a required amount of time at a predetermined temperature. Cooling is subsequently performed, after which trimming is carried out to manufacture the floor silencer 1 with a predetermined shape and dimensions. A preform is made through such hot forming and pressing, and this can be followed by a main formation to manufacture the floor silencer 1. Accordingly, a high-quality floor silencer 1 with higher dimensional accuracy can be achieved.

EXAMPLES

Example 1

The following were used to manufacture the floor silencer 1 of FIG. 1 according to a known method: chips formed from high-grade dust sorted from a resin foam body, such as polyurethane foam and various fibers or the like from the shredder dust of a vehicle; and a binder formed from a core-in-sheath fiber whose sheath portion was made from polyester with a relatively low melting point and whose core portion was made from polyester with a relatively high melting point. The thickness of the foot stay portion 1a of the floor silencer 1 (at the thickest portion) was 35 mm. The tunnel portion 1b had a thin portion whose thickness was 20 mm, and a thick portion whose thickness was 25 mm. The thickness of the rocker portion 1c is 20 mm.

A boundary portion between the foot stay portion 1a and the tunnel portion 1b, as well as a boundary portion between the foot stay portion 1a and the rocker portion 1c was heated and pressed from both surface sides of the floor silencer 1 to provide the band-like concave portion 11 with a width of 15 mm and a depth of 7.5 mm. In order to provide the band-like concave portion 11 such that the depth thereof was 7.5 mm on both surface sides, the total depth of the band-like concave portion 11 was set to 15 mm, and the thickness of the compressed portion was set to 5 mm (wherein the ratio of the width (W) and the depth (d) of the band-like concave portion 11 was 1.0 (W/d=15/(7.5+7.5), and the ratio of the thickness (t) of the band-like concave portion 11 and the thickness (T) at a position adjacent to the band-like concave portion 11 was 0.25 (t/T=5/20) in the floor silencer 1).

Furthermore, the band-like concave portion 11 was provided with a plurality of openings 12 (see FIGS. 7 and 8 regarding the opening 12), having an oval shape with a width of 5 mm and a length of 50 mm, at regular intervals (wherein the shortest dimension between end portions of adjacent openings 12 was 30 mm). Among the openings 12, the openings 12 provided on the band-like concave portion 11 that was provided on the boundary portion between the foot stay portion 1a and the tunnel portion 1b was set to 0.6, were provided such that the ratio (Lo/La) between the total dimension (Lo) of the opening 12 in the length direction of the band-like concave portion 11 and the length (La) of the band-like portion was set to 0.6. This was determined in consideration of the fact that the width of the tunnel portion 1b (a dimension in a height direction thereof when assembled to the floor panel 3 and raised) was set to 300 mm.

The floor silencer 1 manufactured as described above was assembled to both sides of the tunnel of the floor panel 3 of the vehicle, as shown in the schematic diagram of FIG. 2. Both the tunnel portion 1b and the rocker portion 1c were easy to handle during assembly. Good workability was also achieved, with no breakage at the band-like concave portion 11 or large tendency to fall over.

Note that the floor silencer 1 is not provided on the upper portion of the tunnel of the floor panel 3 of the vehicle in FIG. 2, and FIG. 1 is a cross-sectional schematic diagram of the floor silencer 1 at this location. This is because a console box or the like is provided at such a portion. At other locations in the longitudinal direction of the vehicle, there are also other portions where no other members, components, or the like are particularly provided. At such locations, as FIG. 4 shows, the floor silencer 1 is provided continuously from one side of the tunnel to the other (with the floor silencer 1 on the upper portion of the tunnel serving as a tunnel upper portion 1b1). FIG. 3 is a cross-sectional schematic diagram of the floor silencer 1 at this location.

What is claimed is:

1. A floor silencer used with a first surface side in contact with a floor carpet and a second surface side in contact with a floor panel of a vehicle, wherein said floor silencer includes
   a band-like concave portion provided in a thickness direction, wherein
   said floor silencer is foldable along said band-like concave portion, and wherein
   a thickness of said floor silencer at said band-like concave portion is configured to be smaller than a thickness of said floor silencer at a position adjacent to said band-like concave portion.

2. The floor silencer according to claim 1, wherein said floor silencer is transported in a flat state without folding during transport, and is used folded along said band-like concave portion during assembly.

3. The floor silencer according to claim 1, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

4. The floor silencer according to claim 3, wherein a ratio (Lo/La) of a total dimension (Lo) in a length direction of said band-like concave portion of said plurality of openings and a length (La) of said band-like concave portion is 0.4 to 0.8.

5. The floor silencer according to claim 1, wherein a plurality of openings is provided in said band-like concave portion at a predetermined interval.

6. The floor silencer according to claim 5, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

7. The floor silencer according to claim 6, wherein a ratio (Lo/La) of a total dimension (Lo) in a length direction of said band-like concave portion of said plurality of openings and a length (La) of said band-like concave portion is 0.4 to 0.8.

8. The floor silencer according to claim 5, wherein a compressed portion in the thickness direction at said band-like concave portion is distributed more toward a side that will extend after folding.

9. The floor silencer according to claim 8, wherein said compressed portion is formed such that said compressed portion, when folded, is pressed from only the first surface side subject to compression.

10. The floor silencer according to claim 9, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

11. The floor silencer according to claim 10, wherein a ratio (Lo/La) of a total dimension (Lo) in a length direction of said band-like concave portion of said plurality of openings and a length (La) of said band-like concave portion is 0.4 to 0.8.

12. The floor silencer according to claim 11, wherein said floor silencer is transported in a flat state without folding during transport, and is used folded along said band-like concave portion during assembly.

13. The floor silencer according to claim 8, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

14. The floor silencer according to claim 13, wherein a ratio (Lo/La) of a total dimension (Lo) in a length direction of said band-like concave portion of said plurality of openings and a length (La) of said band-like concave portion is 0.4 to 0.8.

15. The floor silencer according to claim 1, wherein a compressed portion in the thickness direction at said band-like concave portion is distributed more toward a side that will extend after folding.

16. The floor silencer according to claim 15, wherein said compressed portion is formed such that said compressed portion, when folded, is pressed from only the first surface side subject to compression.

17. The floor silencer according to claim 16, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

18. The floor silencer according to claim 17, wherein a ratio (Lo/La) of a total dimension (Lo) in a length direction of said band-like concave portion of said plurality of openings and a length (La) of said band-like concave portion is 0.4 to 0.8.

19. The floor silencer according to claim 15, wherein a ratio (W/d) of a width (W) of said band-like concave portion and a depth (d) of said band-like concave portion is 0.5 to 2.0, and a ratio (t/T) of a thickness (t) of said floor silencer at said band-like concave portion and a thickness (T) of said floor silencer at a position adjacent to said band-like concave portion is 0.1 to 0.5.

20. The floor silencer according to claim 19, wherein a ratio (Lo/La) of a total dimension (Lo) in a length direction of said band-like concave portion of said plurality of openings and a length (La) of said band-like concave portion is 0.4 to 0.8.

* * * * *